United States Patent
Klaiber et al.

(10) Patent No.: US 7,917,740 B1
(45) Date of Patent: Mar. 29, 2011

(54) VIRTUALIZATION ASSIST FOR LEGACY X86 FLOATING POINT EXCEPTION HANDLING

(75) Inventors: Alexander C. Klaiber, Mountain View, CA (US); Michael S. Greske, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1424 days.

(21) Appl. No.: 11/066,920

(22) Filed: Feb. 25, 2005

Related U.S. Application Data

(60) Provisional application No. 60/569,995, filed on May 11, 2004.

(51) Int. Cl.
  *G06F 7/38* (2006.01)
  *G06F 9/00* (2006.01)
  *G06F 9/44* (2006.01)
  *G06F 15/00* (2006.01)

(52) U.S. Cl. ..................................................... 712/244
(58) Field of Classification Search ................... 712/244
  See application file for complete search history.

(56) References Cited

U.S. PATENT DOCUMENTS

| | | | | |
|---|---|---|---|---|
| 5,134,693 A | * | 7/1992 | Saini ............................... | 712/244 |
| 5,303,378 A | * | 4/1994 | Cohen ............................ | 710/264 |
| 5,559,977 A | * | 9/1996 | Avnon et al. .................. | 712/244 |
| 5,664,138 A | * | 9/1997 | Yoshida ......................... | 712/219 |
| 5,826,084 A | * | 10/1998 | Brooks et al. ................. | 718/107 |
| 5,860,000 A | * | 1/1999 | Biswas et al. ................. | 712/244 |
| 6,772,327 B2 | * | 8/2004 | Biswas et al. ................. | 712/245 |
| 2003/0037227 A1 | * | 2/2003 | Nomura ......................... | 712/244 |
| 2003/0217250 A1 | * | 11/2003 | Bennett et al. ................ | 712/224 |
| 2004/0117532 A1 | * | 6/2004 | Bennett et al. ................ | 710/260 |

OTHER PUBLICATIONS

P.H. Gum, "System/370 Extended Architecture: Facilities for Virtual Machines," IBM J. Res Develop., vol. 27, No. 6, Nov. 1983, (pp. 530-544).
Jeff Lu, i486 Processor Hardware Reference Manual, 1990, (3 Pages).
James L. Turley, "Advanced 80386 Programming Techniques," ISBN 0-07-881342-5, (35 Pages).

\* cited by examiner

*Primary Examiner* — Eddie P Chan
*Assistant Examiner* — Corey Faherty
(74) *Attorney, Agent, or Firm* — Lawrence J. Merkel; Meyertons, Hood, Kivlin, Kowert & Goetzel, P.C.

(57) ABSTRACT

In one embodiment, a processor comprises an execution core configured to detect a freeze event responsive to an error indication, an ignore error indication, and an instruction in a guest. The instruction belongs to a predefined subset of instructions associated with the error indication and the ignore error indication. The execution core is configured to exit the guest in response to detecting the freeze event. In some embodiments, the error indication and the ignore error indication may be stored in one or more registers in the processor. In some embodiments, the instruction is a floating point instruction, the error indication is a floating pointer error indication, and the ignore error indication is an ignore floating point error indication. In some embodiments, the error indication may correspond to an error signal output by the processor, and the ignore error indication may correspond to an ignore error signal input to the processor.

19 Claims, 7 Drawing Sheets

VIRTUALIZATION ASSIST FOR LEGACY X86 FLOATING POINT EXCEPTION HANDLING

This application claims benefit of priority to U.S. Provisional Patent Application Ser. No. 60/569,995, filed on May 11, 2004.

BACKGROUND

1. Field of the Invention

This invention is related to the field of virtualization and virtual machines and, more particularly, to virtualization of exception handling.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager (VMM) that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Processors that implement the x86 instruction set architecture (also referred to as the IA-32 instruction set architecture) support a mode of handling floating point exceptions that relies on circuitry external to the processor and a pair of signals exchanged between the external circuitry and the processor. The external circuitry is well defined in the personal computer platform (that is, the external circuitry behaves in the same fashion from implementation to implementation).

Generally, the above mode was provided in x86 processors because the floating point unit (FPU) was originally a separate integrated circuit chip from the processor (sometimes referred to as x87). Accordingly, communication between the processor and the FPU was relatively slow, as compared to intrachip communication. A "delayed" floating point exception mechanism was therefore implemented: a floating point (FP) operation that experiences an FP exception does not signal that exception to the processor immediately. Instead, the next FP operation that the processor attempts to provide to the FPU raises the exception.

Since the processor and the FPU were originally on separate chips, a signalling mechanism was needed to permit the FPU to request an FP exception. The following mechanism was used: When the processor attempts to deliver another FP operation after the FP operation that causes an exception, the FPU refused to accept it, which effectively "freezes" the processor. The FPU also asserted an "FERR" signal. Originally, the FERR signal was wired to the "NMI" (non-maskable interrupt) input pin on the processor. So the FPU's assertion of FERR would cause an NMI in the processor, and the NMI handler would take care of the FP exception.

Typically, the NMI handler would clear FP exceptions in the FPU (thus making the FPU deassert FERR) and either abort or resume the program. However, in some cases, the NMI handler accessed the FPU before clearing the FP exception. Without dismissing the FPU exception first, another FPU operation would freeze the processor again. An ignore numeric error (IGNNE) input signal was added to the processor, which caused the processor to ignore the asserted FERR (and not freeze the processor). An OUT instruction was used by the NMI handler to communicate with external circuitry to cause the IGNNE signal assertion. Deassertion of the FERR signal caused the IGNNE signal to deassert.

Later, the FPU was integrated with the processor on the same chip (beginning with the 80486). Thus, the interchip communication mechanism became unnecessary. However, for compatibility reasons, the functionality was retained. In some later processors, a mode was provided in which the FERR signal and the IGNNE signal were emulated internally, storing corresponding bits in registers accessible to processor hardware. The FERR signal asserted by the processor was stored in a register, and the IGNNE signal was emulated by detecting the OUT instruction mentioned above (which addressed a specific, well known port number F0). When the OUT instruction was detected, the IGNNE bit was placed in the asserted state. The emulation also included placing the IGNNE bit in the deasserted state upon deassertion of the FERR signal/bit.

Virtualizing the FERR/IGNNE mechanism is desirable to support virtualization of x86 processors.

SUMMARY

In one embodiment, a processor comprises an execution core configured to detect a freeze event responsive to an error indication, an ignore error indication, and an instruction in a guest. The instruction belongs to a predefined subset of instructions associated with the error indication and the ignore error indication. The execution core is configured to exit the guest in response to detecting the freeze event. In some embodiments, the error indication and the ignore indication may be stored in one or more registers in the processor. In some embodiments, the instruction is a floating point instruction, the error indication is a floating pointer error indication, and the ignore error indication is an ignore floating point error indication. In some embodiments, the error indication may correspond to an error signal output by the processor, and the ignore error indication may correspond to an ignore error signal input to the processor.

BRIEF DESCRIPTION OF THE DRAWINGS

The following detailed description makes reference to the accompanying drawings, which are now briefly described.

Figure 1:
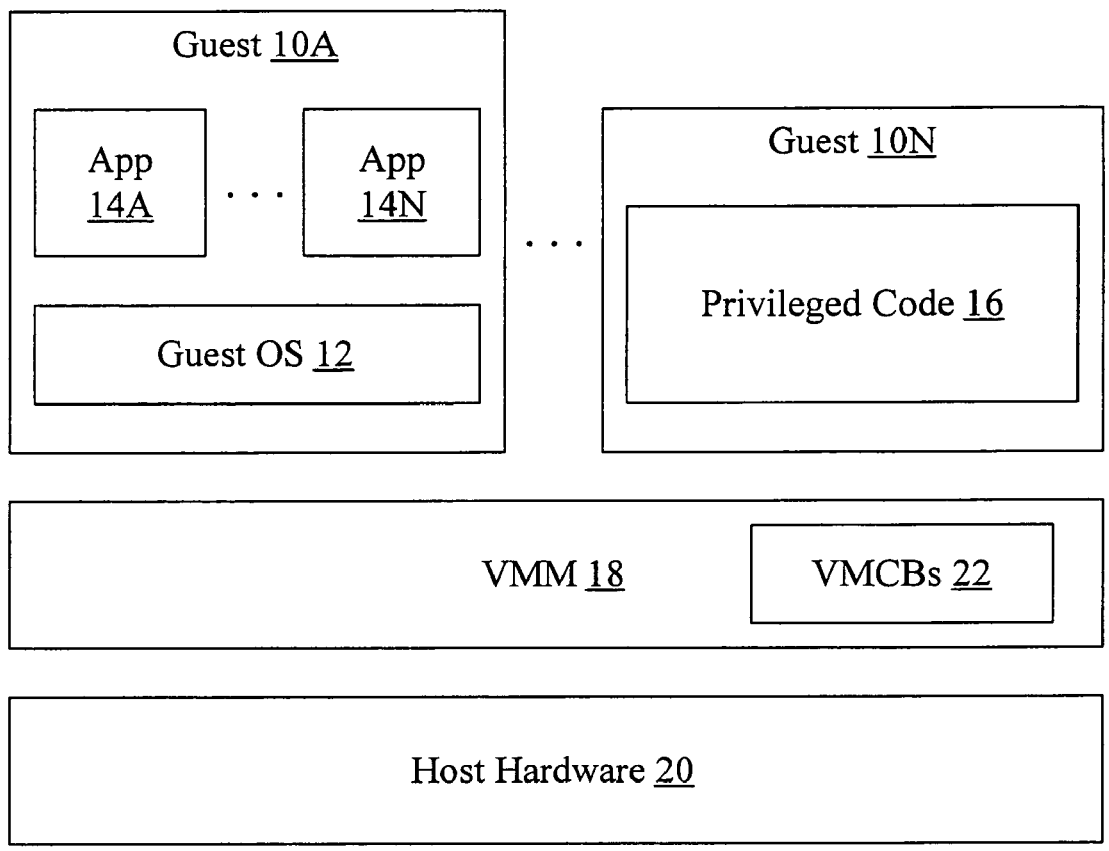
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Exiting the guest may generally refer to interrupting execution of the guest and beginning execution of the VMM (saving some processor state corresponding to the guest in a VMCB 22, for example).

In one embodiment, the VMM 18 may also have an area of memory allocated to store the processor state corresponding to the VMM 18. When the SVM is executed, the processor state corresponding to the VMM 18 may be saved in the area. When the guest exits, the processor state from the area may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Virtualization of FERR/IGNNE Mechanism

In some embodiments, hardware support for virtualizing the FERR/IGNNE signalling mechanism may be provided. For example, in some embodiments, the processor may provide one or more registers to capture the FERR signal state and to emulate the IGNNE signal state, and the registered values may be used by the processor in lieu of the signals. Additionally, the processor may support an intercept of the freeze event. In general, a freeze event may refer to an event in which instruction execution would be halted pending an external interrupt. In the case of the FERR/IGNNE mechanism, the freeze event may comprise an attempt to execute an FP operation with the FERR signal asserted and the IGNNE signal deasserted. If a guest is executing and a freeze event is detected and intercepted, the guest may exit. The VMM 18 may then inject an interrupt into the guest to simulate the operation of the external hardware, thus virtualizing the external hardware. Additionally, in some embodiments, the processor may support software read/write access to the register storing the IGNNE signal state, and the VMM 18 may save and restore the IGNNE signal state corresponding to different guests 10A-10N when switching between guests 10A-10N.

In some embodiments, the FERR/IGNNE signals may not be registered and emulated as described above. In such embodiments, communications with the external logic (e.g. the OUT instruction to port F0) may be intercepted during guest execution to virtualize access to the external logic (and to ensure that the VMM 18 may track the correct IGNNE signal state for each guest 10A-10N). Additionally, the processor may provide a mode in which the external IGNNE signal is ignored and the internal (emulated) IGNNE signal is used instead.

In other embodiments, other types of exception mechanisms that rely on external signalling as part of the exception may be virtualized in a similar fashion. That is, the virtualization may include intercepting the freeze event during guest execution and exiting the guest. The virtualization may also include emulating the external signalling with hardware support (e.g. with indications in registers that correspond to the external signal state).

For example, an exception associated within any subset of instructions executable by a processor may be virtualized in this fashion. The subset may be any group of the instructions in the instruction set that excludes at least some of the instructions in the instruction set. For example, the subset of instructions may be instructions that have a specific operand type (e.g. floating point, integer, multimedia, etc.).

The present description refers to various signals being asserted or deasserted. Generally, a signal may be defined to be asserted in one of its binary states, and deasserted in the other binary state. Either binary state may be the asserted state. That is, a binary state of one may be asserted, or a binary state of zero may be asserted, in various embodiments.

Processor Support

Figure 2:
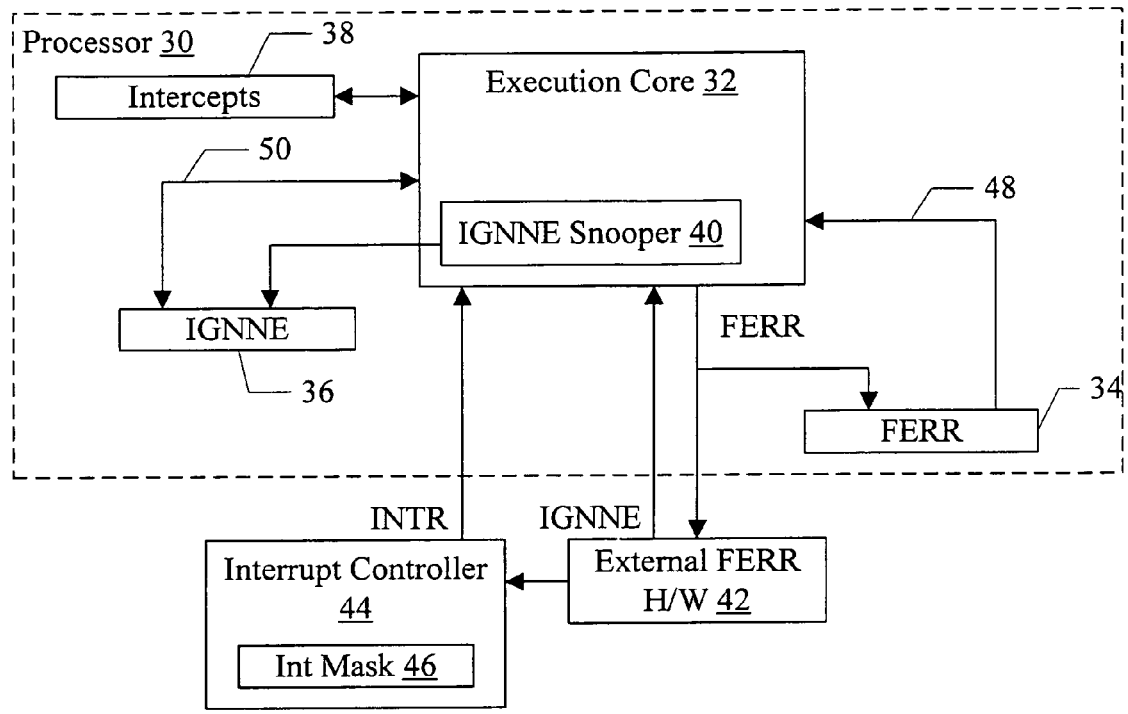
FIG. 2 is a block diagram of a portion of one embodiment of a processor.

FIG. 2 is a block diagram illustrating one embodiment of a processor 30 that may be included in the host hardware 20 as well as external circuitry for FERR/IGNNE handling that may also be included in the host hardware 20. In other embodiments, the external circuitry may be eliminated and may be emulated by the VMM 18. In the illustrated embodiment, the processor 30 includes an execution core 32, an FERR register 34, an IGNNE register 36, and an intercepts register 38. The execution core 32 may include an IGNNE snooper 40. The execution core 32 is coupled to each of the registers 34, 36 and 38. Additionally, the execution core 32 is coupled to provide the FERR signal external to the processor 30 and to receive the IGNNE signal and the INTR signal. The external circuitry may include external FERR hardware (H/W) 42 and an interrupt controller 44 that includes an interrupt mask register 46. The external FERR hardware 42 is coupled to receive the FERR signal from the processor 30 and to provide the IGNNE signal to the processor 30. The external FERR hardware 44 is coupled to interrupt controller 44, which is coupled to provide the INTR signal to the processor 30.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a super-pipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions.

The execution core 32 may be configured to execute floating point instructions, and to detect a floating point exception that causes assertion of the FERR signal. The execution core 32 may assert the FERR signal, and continue asserting the FERR signal until the floating point exception is handled by software. The FERR register 34 may capture the state of the FERR signal. That is, the FERR register may store an FERR indication that represents the state of the FERR signal. For example, the FERR indication may be a bit which may match the binary state of the FERR signal. The FERR register 34 may also be readable by software executing in the execution core 32 (illustrated by the arrow 48 in FIG. 2). For example, the VMM 18 may read the FERR register 34 when switching between guests 10A-10N to detect a floating point exception that is pending from the previous guest. The VMM 18 may ensure that the floating point exception is handled prior to starting another guest, in some embodiments.

The external FERR hardware 42 is coupled to receive the FERR signal asserted by the processor 30 (and more particularly the execution core 32 in the illustrated embodiment). Additionally, the external FERR hardware 42 is coupled to provide the IGNNE signal to the processor 30 (and more particularly to the execution core 32). In response to an assertion of the FERR signal, the external FERR hardware 42 may assert an interrupt request to the interrupt controller 44. Additionally, the external FERR hardware 42 may detect the transmission of a communication from the processor 30 that occurs due to execution of the OUT instruction to the port F0. Responsive to the instruction, the external FERR hardware 42 may assert the IGNNE signal. The external FERR hardware may deassert the IGNNE signal responsive to deassertion of the FERR signal by the processor 30. In various embodiments, the external FERR hardware 42 may comprise discrete logic circuitry implemented on a circuit board in a computer system or may be integrated into other circuitry (e.g. in the SouthBridge often included in PC-type systems).

The processor 30 may also include the IGNNE register 36 to emulate the operation of the IGNNE signal. That is, the IGNNE register 36 may include an indication that tracks the state of the IGNNE signal (or the state the IGNNE signal would have, if the external logic is eliminated from a system in favor or IGNNE emulation). The IGNNE snooper 40 may detect execution of the OUT instruction to the port F0, and may update the IGNNE indication to indicate assertion of the IGNNE signal. Additionally, the IGNNE snooper 40 may detect that the FERR signal is being deasserted, and may update the IGNNE indication to indicate deassertion of the IGNNE signal. The IGNNE snooper 40 may be implemented in any combination of hardware and/or microcode in the execution core 32, in various embodiments.

In one embodiment, emulation of the IGNNE signal via the IGNNE register 36 may be enabled by a bit in a configuration register in the processor 30 (not shown in FIG. 2). In such embodiments, the emulated IGNNE signal represented in the IGNNE register 36 may be used instead of the IGNNE input signal from the external FERR hardware 42. The processor 30 may be configured to ignore the IGNNE input signal from the external FERR hardware 42 and use the emulated IGNNE signal represented in the IGNNE register 36.

Generally, if the execution core 32 attempts to execute a floating point instruction, the execution may proceed unless the FERR signal is asserted. If the FERR signal is asserted and the IGNNE signal is asserted (or the IGNNE indication in the IGNNE register 36 represents assertion of the IGNNE signal), the execution core 32 may also execute the floating point instruction. If the FERR signal is asserted and the IGNNE signal is deasserted (or the IGNNE indication in the IGNNE register 36 represents deassertion of the IGNNE signal), the execution core 32 may freeze execution and await the external interrupt (or may exit the guest, if the floating point freeze event is intercepted).

In one embodiment, the IGNNE register 36 may be readable and writeable by software executing in the execution core 32 (e.g. illustrated by the arrow 50 in FIG. 2). For example, the VMM 18 may include instructions which read the IGNNE register 36 to capture the state of the IGNNE signal that corresponds to a guest 10A-10N that is being switched away from (the "previous guest") and may include instructions which write the IGNNE register 36 with the state of the IGNNE signal that corresponds to a guest 10A-10N that is being switched to (the "new guest").

In some embodiments, the IGNNE register 36 and the FERR register 34 may be the same physical register, with the IGNNE indication stored as one field in the register (readable and writeable by software) and the FERR indication stored as another field in the register (readable by software). The IGNNE register 36 and the FERR register 34 may be made software accessible in a variety of fashions. For example, the registers may be addressable in the model specific register (MSR) address space defined in the x86 instruction set architecture, in some embodiments. Other embodiments may address the registers in other fashions (e.g. input/output (I/O) address space, memory mapping, other special purpose register addressing mechanisms, etc.).

The interrupt controller 44 is configured to receive interrupt requests (e.g. from the external FERR hardware 42 as well as from other sources, not shown in FIG. 2). The interrupt controller 44 may assert one or more interrupt signals to the processor 30 (e.g. the INTR signal shown in FIG. 2 as well as other signals such as non-maskable interrupt (NMI), system management interrupt (SMI), etc.) to cause the processor to take an interrupt. In one embodiment, the interrupt controller 44 may be an implementation of the Advanced Programmable Interrupt Controller (APIC) specification from Intel Corporation (Santa Clara, Calif.). Other embodiments may implement other designs. The interrupt controller 44 may use the INTR interrupt signal to interrupt the processor 30 in response to the FERR signal.

In the illustrated embodiment, the interrupt controller 44 may include an interrupt mask register 46. The interrupt mask register 46 may be programmable (e.g. by software executing in the processor 30) to mask various interrupt requests such that an interrupt is not signalled to the processor 30 even if the interrupt is requested. The interrupt mask register 46 may be programmable, e.g., to mask the interrupt request from the external FERR hardware 42. This masking function may, in some embodiments, be used by the VMM 18 to disable the external hardware for handling FERR.

The intercepts register 38 may represent at least one register, and may be multiple registers in some embodiments. The execution core 32 may be configured to monitor for various intercepts indicated in the intercepts register 38. The intercepts register may be loaded from the VMCB 22 of a guest 10A-10N when execution of that guest 10A-10N is initiated (e.g. using the SVM instruction described above). If the execution core 32 detects an interceptable event and the intercepts register indicates that the detected event is being intercepted, the execution core 32 may exit the guest being executed and return to the VMM 18. If no intercepts are coded in the intercepts register, then a guest is not in execution. "Enabling an event" in the intercepts register 38 may refer to storing an indication in the intercepts register 38 that indicates that the event is to be intercepted. In other embodiments, there may be a "guest mode" bit and all interceptable events may be intercepted. In one embodiment, one of the interceptable events may be the floating point freeze event, as described below with regard to FIG. 3.

As used herein, the term register refers to any storage location implemented in the processor that is addressable using an instruction. Registers may be implemented in various fashions. For example, registers may be implemented as any sort of clocked storage devices such as flops, latches, etc. Registers may also be implemented as memory arrays, where a register address may be used to select an entry in the array. Any combination of implementations may be used in various embodiments of the processor 30.

Figure 3:
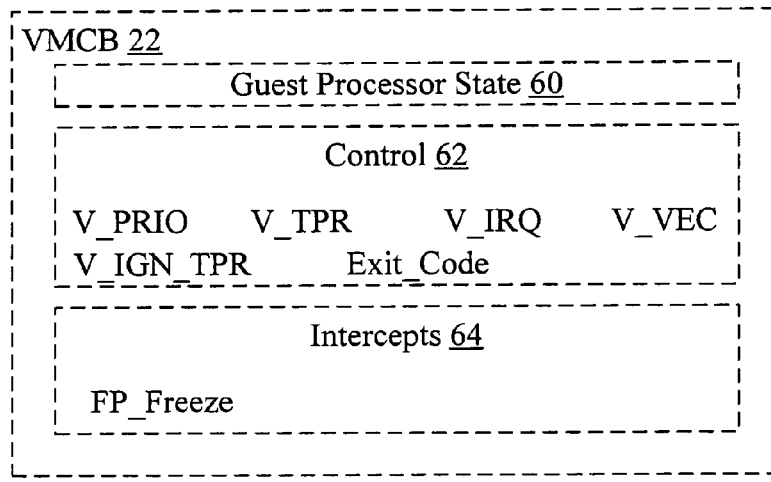
FIG. 3 is a block diagram of one embodiment of a virtual machine control block.

FIG. 3 is a block diagram of one embodiment of a VMCB 22. In the embodiment of FIG. 3, the VMCB 22 may include a guest processor state 60, control data 62, and intercepts 64. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the SVM instruction (a switch from the VMM 18 to the guest 10A-10N that corresponds to the VMCB 22). The processor 30 may save processor state from the processor 30 to the guest processor state 60 during the guest exit (a switch from the guest 10A-10N that corresponds to the VMCB 22 to the VMM 18). The guest processor state 60 may be defined to store all the processor state, in some embodiments. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit ("Exit_Code" in FIG. 3). The control data 62 may also include virtual interrupt state that may be used to inject a virtual interrupt into the processor 30, in one embodiment. The virtual interrupt state may be loaded into the processor 30 via the SVM instruction, and may cause the guest to take an interrupt according to the interrupt model implemented by the processor 30. In the illustrated embodiment, the virtual interrupt state is similar to the APIC specification defined by Intel Corp. Other embodiments may use other virtual interrupt state or may not provide virtual interrupt state for interrupt injection.

In the illustrated embodiment, the virtual interrupt state includes a virtual interrupt request (V_IRQ). The V_IRQ may be, for example, a bit that indicates a virtual interrupt request when set and indicates no virtual interrupt request when clear. In other embodiments, the opposite meanings may be assigned to the states of the bit or multibit indications may be used. Responsive to the V_IRQ (and if virtual interrupts are not masked in the guest), the processor 30 may take a virtual interrupt.

The virtual interrupt state may further include various values that identify the specific interrupt to be taken. For example, in the illustrated embodiment, the virtual interrupt priority (V_PRIO) and the virtual interrupt vector (V_VEC) may be provided. The V_PRIO may be the priority level of the virtual interrupt, for comparison to the task priority register (TPR) defined in the APIC specification. The virtual interrupt vector may be the interrupt vector used for the interrupt. Accordingly, when taking a virtual interrupt, the processor 30 may read the V_VEC rather than issuing an interrupt acknowledge command to the interrupt controller.

In one embodiment, the processor 30 also implements a virtual TPR (V_TPR) that may be read/written by the guest executing on the processor 30. The processor 30 may compare the V_TPR to the V_PRIO to determine if the virtual interrupt is to be taken. Additionally, in one embodiment, an ignore TPR bit (V_IGN_TPR) may be set to override the comparison of the V_TPR to the V_PRIO and cause the interrupt to be taken.

The intercepts 64 may specify which events are to be intercepted (causing an exit from the guest). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. In the illustrated embodiment, an FP_Freeze intercept is included in the intercepts 64. The FP_Freeze intercept may intercept the freezing of the execution core 32 if a floating point instruction is detected by the execution core 32 (e.g. execution of the floating point instruction is attempted), the FERR signal/bit is asserted and the IGNNE signal/bit is deasserted.

Figure 4:
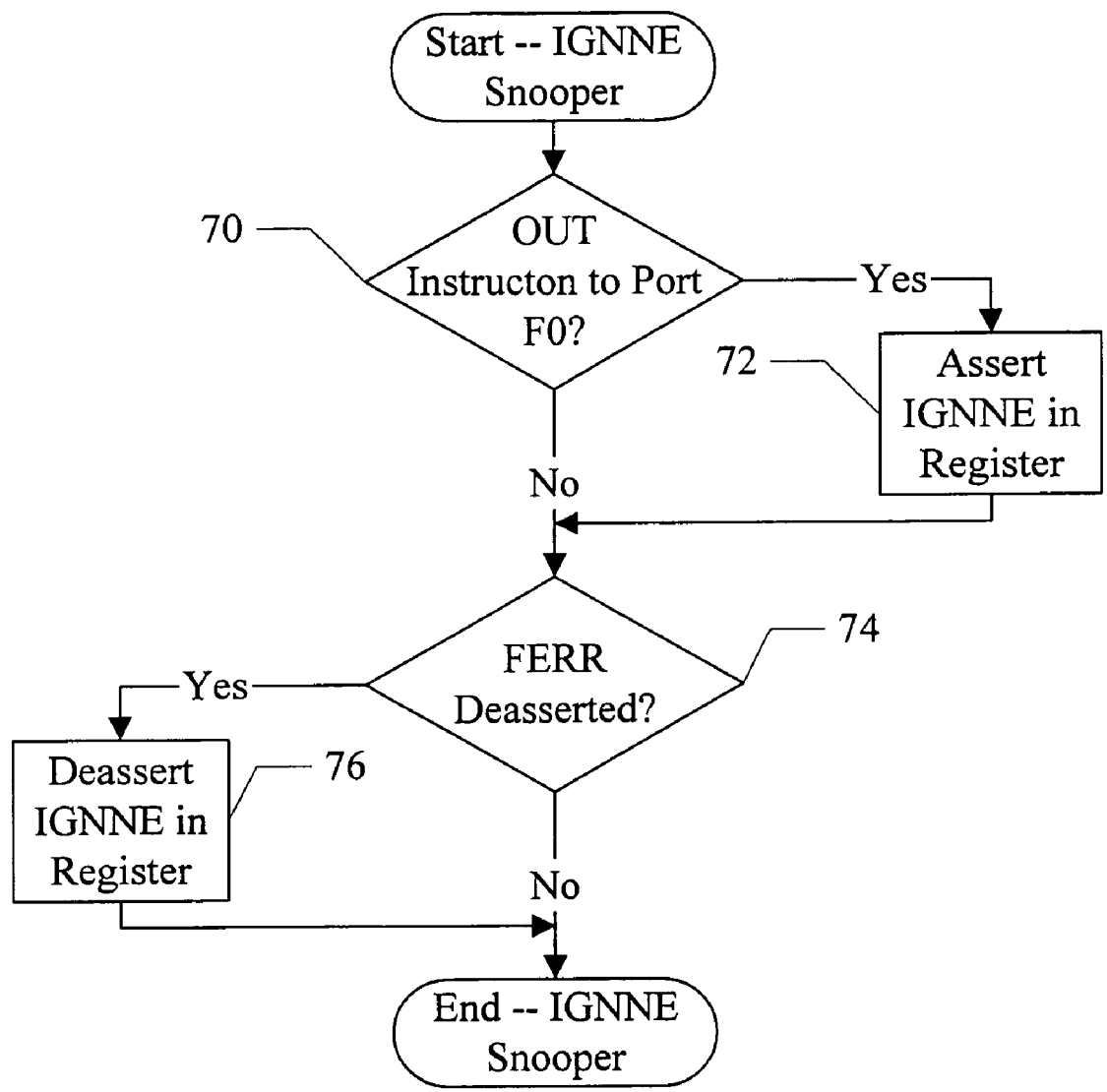
FIG. 4 is a flowchart illustrating operation of one embodiment of an ignore error snooper shown in FIG. 3.

Turning now to FIG. 4, a flowchart is shown illustrating operation of one embodiment of the IGNNE snooper 40 shown in FIG. 2. While the blocks are shown in a particular order for ease of understanding, any order may be used. Particularly, the decision blocks 70 and 74 are independent and may be performed in either order. Furthermore, implementations of the IGNNE snooper 40 that are in hardware or partially in hardware (rather than microcode) may perform the blocks in parallel in combinatorial logic circuitry implemented therein. Blocks, combinations of blocks, or the flowchart as a whole may be pipelined over multiple clock cycles, in other embodiments.

If the IGNNE snooper 40 detects that the execution core 32 is executing an OUT instruction to the port F0 (decision block 70, "yes" leg), the IGNNE snooper 40 may place the IGNNE indication in the IGNNE register 36 into an asserted state (corresponding to the assertion of the IGNNE signal) (block 72). As mentioned previously, the OUT instruction to the port F0 is used to access the external FERR hardware 42. Other embodiments may use other ports, or may use other instruction to access the external FERR hardware 42. The OUT instruction in the x86 instruction set may be an instruction defined to access an input/output (I/O) space that comprises a set of ports. The port number may be supplied via an operand or operands of the OUT instruction. Other definitions of I/O instructions may be used in other embodiments.

The IGNNE snooper 40 may also be configured to detect when the FERR signal is deasserted by the execution core 32 (either by monitoring the FERR register 34 or the FERR signal, in various embodiments). If the FERR signal is deasserted (decision block 74, "yes" leg), the IGNNE snooper 40 may place the IGNNE indication in the IGNNE register 36 into a deasserted state (corresponding to the deassertion of the IGNNE signal) (block 76). The IGNNE snooper 40 may not, in some embodiments, prevent the OUT instruction from completing. Thus, the external FERR hardware 42 may still receive the communication and assert the IGNNE signal, in such embodiments.

Figure 5:
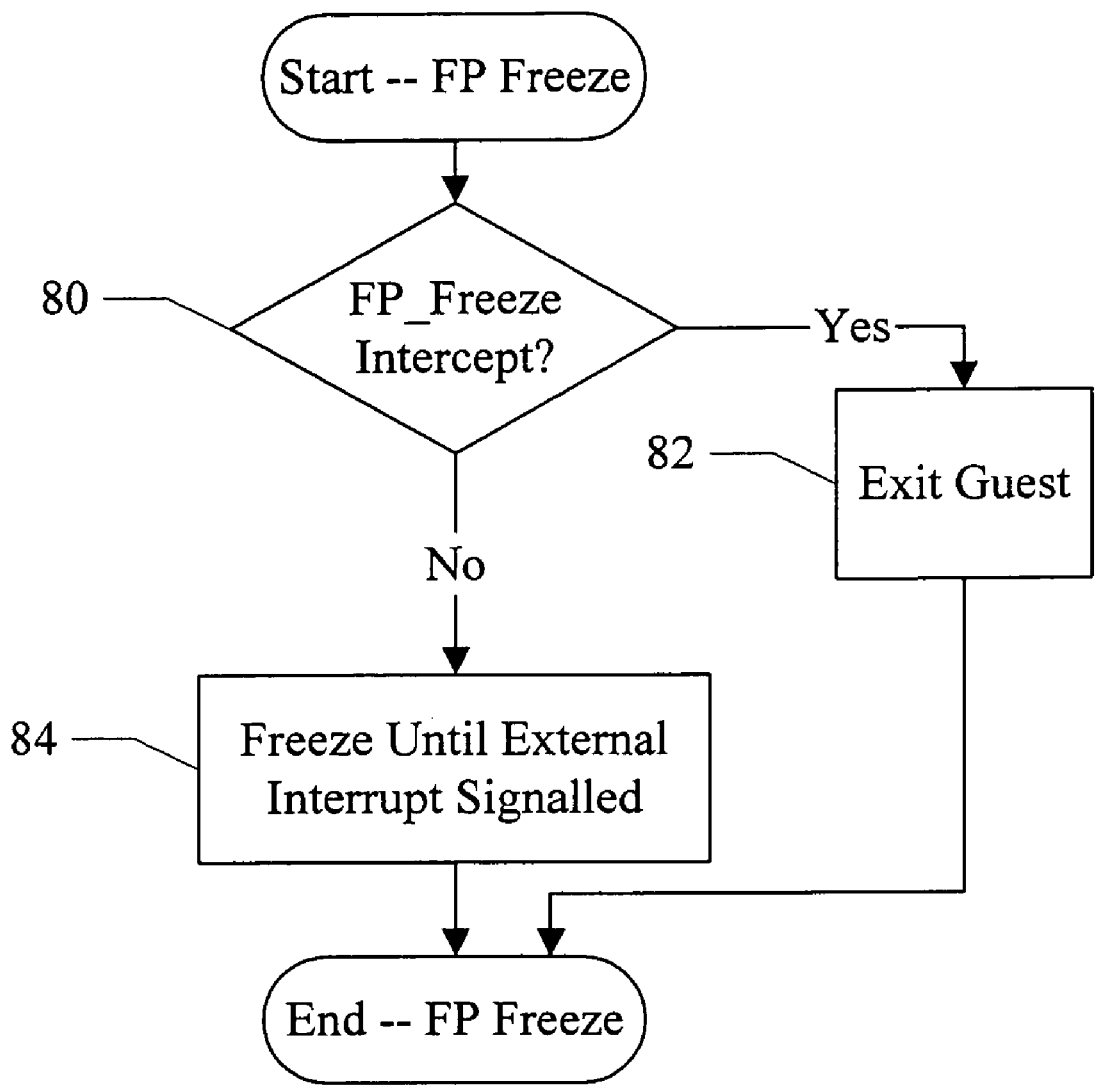
FIG. 5 is a flowchart illustrating operation of one embodiment of a processor in response to detecting a floating point freeze event.

Turning next to FIG. 5, a flowchart is shown illustrating operation of one embodiment of the execution core 32 shown in FIG. 2 in response to detecting an FP freeze event. The FP freeze event may be detected if a floating point instruction is detected (e.g. an attempt to execute the floating point instruction occurs), the FERR signal/indication is asserted, and the IGNNE signal/indication is deasserted. While the blocks are shown in a particular order for ease of understanding, any order may be used. Furthermore, blocks may be performed in parallel in combinatorial logic circuitry implemented in the execution core 32, in some embodiments. Blocks, combinations of blocks, or the flowchart as a whole may be pipelined over multiple clock cycles, in other embodiments.

The execution core 32 may determine if the FP_Freeze intercept is enabled in the processor 30 (decision block 80). For example, the FP_Freeze intercept bit may be set in the intercepts register 38 if the FP_Freeze intercept is enabled. If the FP_Freeze intercept is enabled (decision block 80, "yes" leg), the execution core 32 may exit the guest (block 82). The VMM 18 may be resumed in the execution core 32 to process the freeze event. If the FP_Freeze intercept is not enabled, either a guest is not in execution or a guest is being executed and the FERR/IGNNE functionality is not virtualized (decision block 80, "no" leg). In that case, the execution core 32 may freeze execution until an external interrupt is signalled (block 84).

Figures 6, 7:
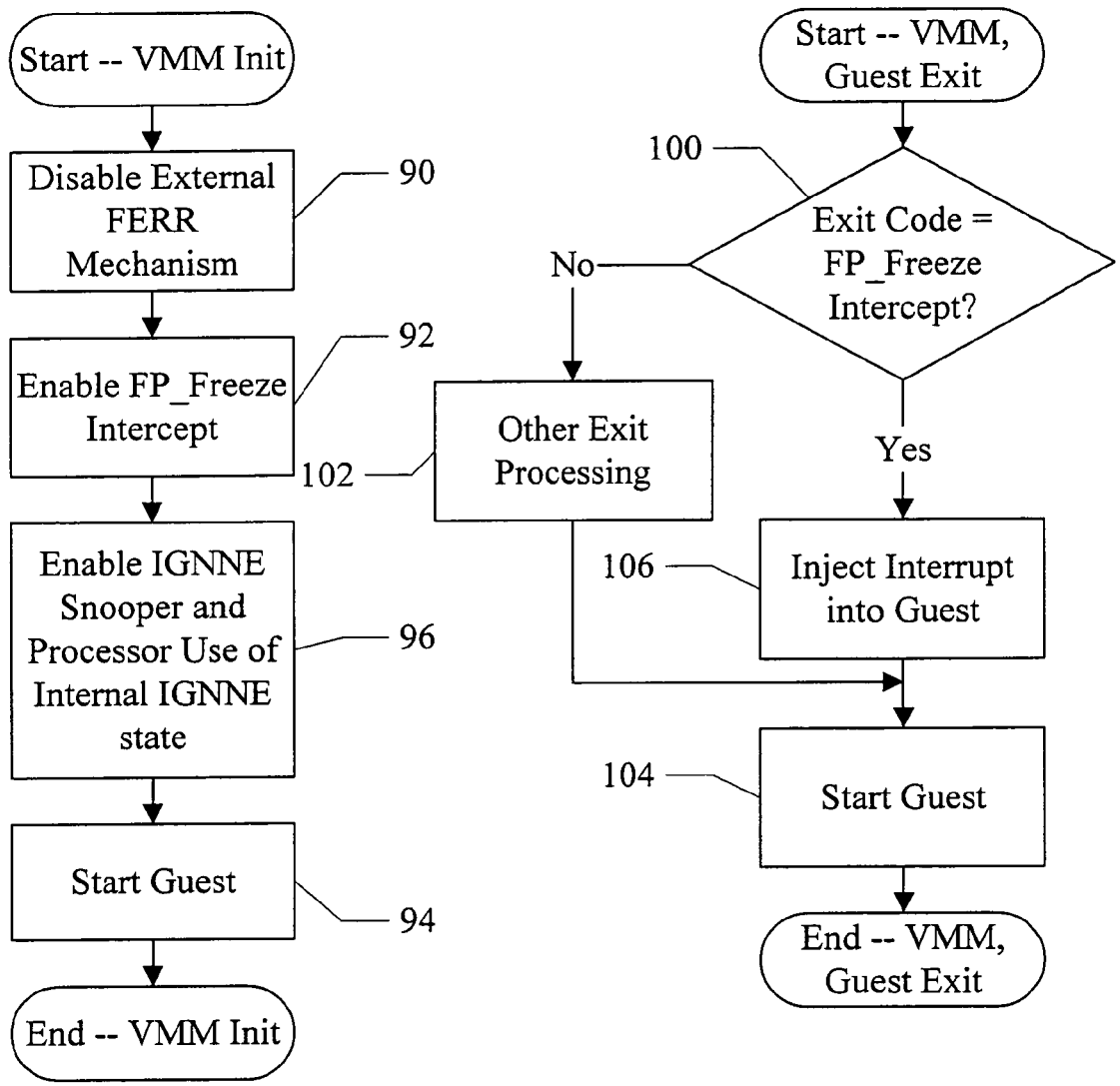
FIG. 6 is a flowchart illustrating one embodiment of a virtual machine manager initializing a virtual machine guest.
FIG. 7 is a flowchart illustrating one embodiment of a virtual machine manager executing in response to a guest exit.

Turning now to FIG. 6, a flowchart is shown illustrating operation of one embodiment of the VMM 18 for initializing a guest (e.g. including constructing a VMCB 22 for the guest). The VMM 18 may include instructions which, when executed, implement the operation shown in FIG. 6. While the blocks are shown in a particular order for ease of understanding, any order may be used.

The initialization of the guest, including constructing the VMCB 22, may include a variety of operations for generating various state for the guest. FIG. 6 illustrates initialization related to virtualizing the FERR/IGNNE mechanism. Other operations for initialization may be performed before, after, or in between the operations shown in FIG. 6.

The VMM 18 may disable the external (to the processor 30) FERR mechanism (block 90). For example, in one embodiment, the VMM 18 may mask the interrupt request corresponding to the external FERR hardware 42 in the interrupt controller 44. Other embodiments may disable the external FERR mechanism in other fashions. For example, in some embodiments, the external FERR hardware 42 may be configured to be disabled by software. The VMM 18 may disable the external FERR hardware 42 in such embodiments. Additionally, the VMM 18 may enable the FP_Freeze intercept in the intercepts 64 of the guest's VMCB 22 (block 92). The VMM 18 may also enable the IGNNE snooper 40 and set up the processor 30 to use the internal IGNNE state generated by the IGNNE snooper 40 instead of the external IGNNE signal. For example, in one embodiment, the VMM 18 may program an MSR to ignore the IGNNE signal and use the internal IGNNE state. Other embodiments may use any other type of register to program the IGNNE mode. The VMM 18 may start the guest (e.g. using the SVM instruction) (block 94).

Turning now to FIG. 7, a flowchart is shown illustrating operation of one embodiment of the VMM 18 in response to a guest exit. The VMM 18 may include instructions which, when executed, implement the operation shown in FIG. 7. While the blocks are shown in a particular order for ease of understanding, any order may be used.

The processing of the guest exit may include a variety of operations for saving various state for the guest, updating stating, processing related to a specific exit code, etc. FIG. 7 illustrates processing related to virtualizing the FERR/IGNNE mechanism. Other operations for initialization may be performed before, after, or in between the operations shown in FIG. 7.

The VMM 18 may examine the exit code to determine the reason for the guest exit (decision block 100). For example, in the embodiment illustrated in FIG. 3, the exit code may be written to the control data 62 in the VMCB 22 as part of the guest exit. If the exit code does not indicate an exit due to an FP_Freeze intercept (decision block 100, "no" leg), the VMM 18 may process the exit condition indicated by the exit code (block 102). The processing may involve a variety of operations, in various embodiments, dependent on the different guest exits that may occur. Various guest state in the VMCB 22, other memory locations, or in the processor itself may be modified. Subsequent to the processing, the VMM 18 may start the guest again (e.g. using the SVM instruction) (block 104). If the exit code indicates an exit due to an FP_Freeze intercept (decision block 100, "yes" leg), the VMM 18 may inject an interrupt into the guest to simulate the interrupt that the external FERR mechanism would have previously provided (block 106). The VMM 18 may start the guest again so that the guest takes the interrupt (block 104).

In some embodiments, injecting the interrupt into the guest may utilize the virtual interrupt injection mechanism described above, using the virtual interrupt values in the control data 62 of the VMCB 22 for the guest. Alternatively, other embodiments may not implement the virtual interrupt injection mechanism. In such embodiments, the VMM 18 may determine if the guest's virtual processor is in a state that would permit the interrupt to be taken if the guest were executing on the physical machine. The checking may include examining various state that may prevent interrupts from being taken (e.g. interrupt enables), as well as examining which instructions have recently been executed in the guest. If the guest's virtual processor would take the interrupt, the VMM 18 may then modify the state of the guest's virtual machine (e.g. in one or more of the VMCB 22, other memory locations such as the state save area defined in the x86 processor architecture, other memory locations allocated to the guest, and/or in the processor 30 itself). The modifications change the state of the virtual machine to the state that would result if the processor had taken an interrupt. For example, execution of the currently executing program may be suspended; some amount of state related to the currently executing program may be saved, such as the current program counter; other processor state that would be changed on taking an interrupt may be changed (e.g. processor mode registers); and the program counter may be changed to the address of the first instruction in the interrupt handler.

Figure 8:
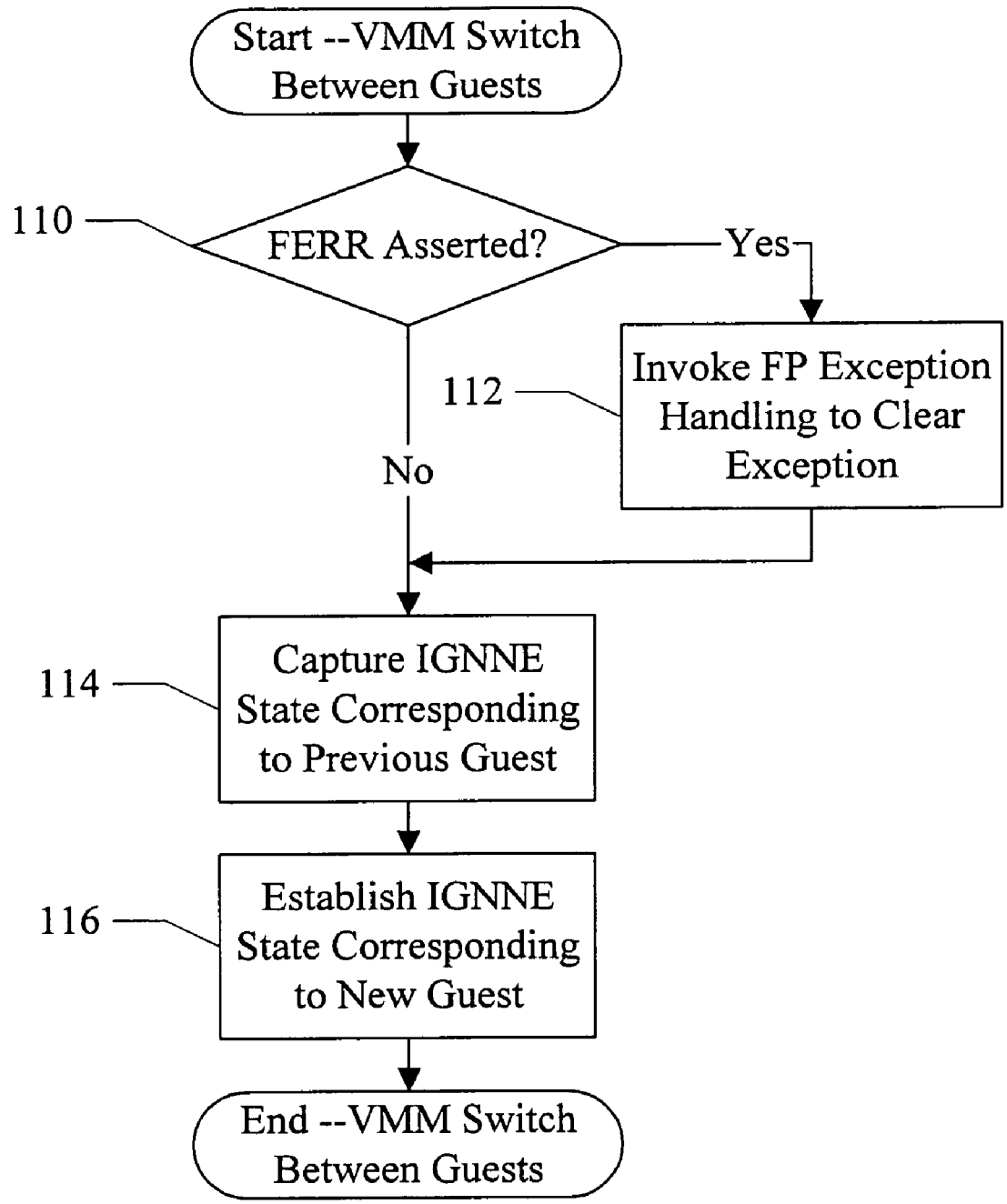
FIG. 8 is a flowchart illustrating one embodiment of a virtual machine manager executing when switching between guests.

While FIG. 7 shows the VMM 18 restarting the guest that exited after processing the guest exit, in other embodiments a different guest may be selected for execution. In such cases, some processor state from the processor 30 may be saved (for the previous guest) and restored (for the new guest). FIG. 8 is a flowchart illustrating state modifications related to the FERR/IGNNE mechanism. Other processor state modifications may be performed as desired before, after, or in between the operations shown in FIG. 8. The VMM 18 may comprise instructions which, when executed, implement the operation shown in FIG. 8.

The VMM 18 may determine if a floating point exception is pending (e.g. if the FERR signal is asserted—decision block 110). In the embodiment of FIG. 2, the VMM 18 may read the FERR register 34 to determine the state of the FERR signal. If the FERR signal is asserted (decision block 110, "yes" leg), there is a floating point exception pending for the guest that exited. The VMM 18 may invoke FP exception handling code (either within the VMM 18, or as part of a host OS or other software) to clear the exception (block 112). The exception information, or the clearing of the exception, may be saved with regard to the previous guest so that it can be restored when the previous guest is later scheduled for execution.

The VMM 18 may read the IGNNE register 36 to capture the IGNNE state corresponding to the previous guest (block 114). The VMM 18 may save the IGNNE state for restoration when the previous guest is scheduled (e.g. in the previous guest's VMCB 22, or in other memory in which the VMM 18 stores such information, in various embodiments). The VMM 18 may also write the IGNNE register 36 to restore the IGNNE state corresponding to the new guest (block 116). The IGNNE state for the new guest may be read from the new guest's VMCB 22, or from other memory in which the VMM 18 stores such information, in various embodiments.

Figure 9:
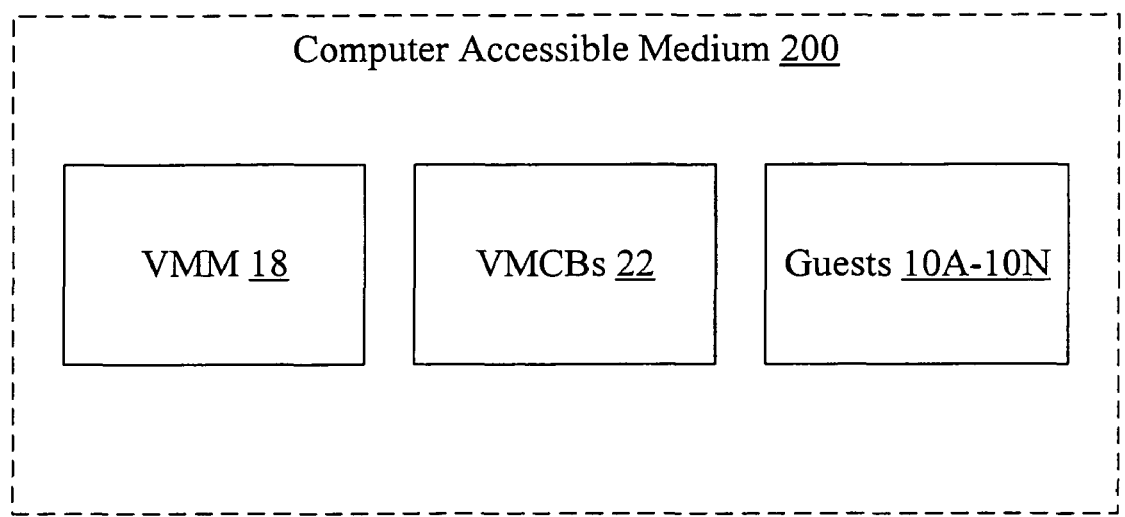
FIG. 9 is a block diagram of one embodiment of a computer accessible medium.

Turning now to FIG. 9, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 9 may store one or more of the VMM 18, one or more VMCBs 22, and/or guests 10A-10N. The VMM 18 may comprise instructions which implement the operations described for the VMM 18 herein. Generally, the computer accessible medium 200 may store any set of instructions which, when executed, implement a portion or all of the operations shown in one or more of FIGS. 6-8. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:
one or more registers configured to store: (i) a floating point error indication that corresponds to a floating point error output signal transmitted by the processor external to the processor to indicate a floating point exception, and (ii) an ignore error indication that corresponds to an ignore error input signal to the processor, wherein an asserted ignore error input signal indicates that the floating point error signal is to be ignored; and
an execution core coupled to the one or more registers, wherein the execution core is configured to update the floating point error indication and the ignore error indication to track a state of the floating point error output signal and to emulate the ignore error input signal, respectively, and wherein the execution core is configured to execute floating point instructions, and wherein the execution core is configured to detect a floating point instruction in a guest for which execution would be frozen if the floating point error signal is asserted and the ignore error signal is deasserted, and wherein the execution core is configured to exit the guest responsive to detecting the floating point instruction and responsive to the floating point error indication and the ignore error indication.

2. The processor as recited in claim 1 further comprising a second one or more registers programmable with a plurality of intercepts including a floating point freeze intercept, and wherein the execution core is configured to exit the guest further responsive to the floating point freeze intercept being enabled.

3. The processor as recited in claim 1 wherein the execution core is configured to detect a second floating point instruction not included in a guest, and wherein the execution core is configured to freeze execution until an external interrupt is received by the processor, wherein the execution core is configured to freeze execution responsive to the floating point error indication indicating error and the ignore indication not indicating ignore.

4. The processor as recited in claim 1 wherein the execution core is configured to execute the floating point instruction if the floating point error indication does not indicate an exception.

5. The processor as recited in claim 4 wherein the execution core is configured to execute the floating point instruction if the ignore error indication indicates that the floating point error indication is to be ignored, even if the floating point error indication indicates the exception.

6. The processor as recited in claim 1 wherein the execution core is configure to assert the floating point error output signal responsive to detecting the exception, and wherein the one or more registers capture a state of the floating point error output signal as the floating point error indication.

7. The processor as recited in claim 1 wherein the execution core is configured to detect an instruction that is to access external circuitry that controls the ignore error input signal, and wherein the execution core is configured to update the ignore error indication responsive to detecting the instruction.

8. The processor as recited in claim 1 further comprising a pin on which the ignore error input signal is receivable, wherein the processor is configured to ignore the ignore error input signal and instead use the ignore error indication from the one or more registers.

9. A processor comprising an execution core configured to detect a freeze event responsive to an error indication, an ignore error indication, and a first instruction in a guest, wherein the execution core is configured to execute the first instruction, and wherein the first instruction belongs to a predefined subset of instructions associated with the error indication and the ignore error indication, and wherein the error indication corresponds to an error output signal transmitted by the processor external to the processor to indicate an exception corresponding to execution of one of the subset of instructions, and wherein the ignore error indication corresponds to an ignore error input signal to the processor that indicates, when asserted, that the exception is to be ignored, and wherein the execution core is configured to exit the guest in response to detecting the freeze event.

10. The processor as recited in claim 9 further comprising one or more registers coupled to the execution core, wherein the one or more registers are configured to store the error indication and the ignore error indication.

11. The processor as recited in claim 9 further comprising at least one register coupled to the execution core, the at least one register programmable with a plurality of intercept indications including an freeze intercept indication that enables the execution core to exit the guest in response to the freeze event.

12. The processor as recited in claim 9 wherein the execution core is configured to detect the freeze event if the error indication indicates the error and the ignore error indication does not indicate that the error indication is being ignored.

13. The processor as recited in claim 9 wherein the execution core is configured to freeze execution if the first instruction is not included in a guest.

14. The processor as recited in claim 9 wherein the subset of instructions are floating point instructions.

15. A computer accessible storage medium storing a plurality of instructions including instructions which, when executed in a processor:
   disable circuitry external to the processor from causing an external interrupt to the processor, the circuitry configured to cause the external interrupt responsive to an error signal asserted by the processor, wherein the error signal is asserted by the processor in response to detecting an exception associated with execution of one of a subset of instructions executable by the processor;
   enable an intercept in the processor of a freeze event during execution of a guest, wherein the freeze event is detected by the processor responsive to the error, a lack of an assertion of an ignore error indication associated with the subset of instructions, and an attempt to execute one of the subset of instructions;
   configure the processor to ignore an external ignore error signal receivable on a in of the processor and instead use the ignore error indication wherein the ignore error indication is generated internally by the processor.

16. The computer accessible storage medium as recited in claim 15 wherein the instructions, when executed, start the guest executing on the processor.

17. The computer accessible storage medium as recited in claim 15 wherein the instructions disable the external circuitry by masking the external interrupt in an interrupt mask register included in the external circuitry.

18. The computer accessible storage medium as recited in claim 15 wherein the plurality of instructions further comprise instructions which, when executed in response to an exit from the guest:
   determine that the exit occurred due to the detection of the freeze event; and
   inject an interrupt into the guest.

19. The computer accessible storage medium as recited in claim 15 wherein the subset of instructions are floating point instructions.

* * * * *

UNITED STATES PATENT AND TRADEMARK OFFICE
CERTIFICATE OF CORRECTION

PATENT NO. : 7,917,740 B1  
APPLICATION NO. : 11/066920  
DATED : March 29, 2011  
INVENTOR(S) : Alexander C. Klaiber and Michael S. Greske It is certified that error appears in the above-identified patent and that said Letters Patent is hereby corrected as shown below:

In the Claims:

Claim 15, col. 16, line 23, after "instruction;", please insert --and--.

Claim 15, col. 16, line 25, after "receivable on a", please delete "in" and insert --pin--.

Signed and Sealed this  
Thirty-first Day of May, 2011

David J. Kappos  
*Director of the United States Patent and Trademark Office*